United States Patent [19]

Dugan et al.

[11] Patent Number: 5,351,130
[45] Date of Patent: Sep. 27, 1994

[54] SATELLITE RECEIVER WITH IMPROVED MEMORY BACK-UP AND LOADING CAPABILITIES

[75] Inventors: Michael T. Dugan, Parker; Joseph T. Cilke, Highlands Ranch; Bruce S. Petrie, Denver, all of Colo.

[73] Assignee: Houston Satellite Systems, Inc., Englewood, Colo.

[21] Appl. No.: 10,429

[22] Filed: Jan. 28, 1993

[51] Int. Cl.$^5$ .............................................. H04N 5/44
[52] U.S. Cl. ..................................... 358/725; 455/3.2; 360/33.1; 348/473
[58] Field of Search ...................... 358/194.1, 188, 903, 358/147, 142; 455/3.2, 186.1, 186.2; 360/15, 33.1; H04N 5/44

[56] References Cited

U.S. PATENT DOCUMENTS

| | | | |
|---|---|---|---|
| 4,425,586 | 1/1984 | Miller | 358/903 |
| 4,720,873 | 1/1988 | Goodman et al. | 455/3.2 |
| 4,789,961 | 12/1988 | Tindall | 360/33.1 |
| 4,825,306 | 4/1989 | Robers | 358/142 |
| 4,866,787 | 9/1989 | Olesen | 455/3 |
| 4,949,187 | 8/1990 | Cohen | 360/15 |
| 5,019,910 | 5/1991 | Filmer | 455/3.2 |
| 5,175,624 | 12/1992 | Hieda et al. | 358/903 |

Primary Examiner—James J. Groody
Assistant Examiner—Jeffrey S. Murrell
Attorney, Agent, or Firm—Sheridan Ross & McIntosh

[57] ABSTRACT

A television signal satellite receiver that, in one embodiment, is capable of utilizing the recording and playback capabilities of a video signal recorder, such as a video cassette recorder (VCR), to back up data contained in the satellite receiver memory and/or to load the memory with data. Typical data to be backed up or loaded into the memory includes satellite position data, which is unique with respect to the location of each satellite receiver and, more specifically, to the location of the antenna associated with the receiver. To back up data, the satellite receiver employs a translator that converts data contained in the satellite receiver memory from a digital format to a video signal format that is appropriate for the video signal recorder. Conversely, to load the memory with data, the translator converts data with the video signal format that is provided by the video signal recorder into a digital signal format that can be loaded into the memory of the satellite receiver. In one embodiment, the satellite receiver provides information, such as instructions on a data back-up operation, to a user by providing a signal to the user's television with the appropriate textual material contained therein.

2 Claims, 19 Drawing Sheets

| 32H | 02H | SEQ NUM | SEQ NUM | MON MM | DAY DD | YR YY | HR HH | MIN NN | ASC V1 | ASC V2 | ASC V3 | ASC V4 | ASC V5 | ... | BCK FLG | CHK SUM |

| ASC V6 | ASC V7 | ASC V8 | ASC V9 | ASC V10 | ASC V11 | ASC V12 | TRM 00H | MOD EL | BCK FLG | ... |

MM,DD,YY - DATE OF BACKUP (EXAMPLE JULY 7, 1992 STORED AS 07 07 92)
HH,NN - TIME OF BACKUP (EXAMPLE 1:34 PM STORED AS 13 34)
V1-V12 - VERSION OF BACKUP (STORED AS ASCII CHARACTERS, TERMINATED BY NULL CHARACTER)
MODEL - NUMERIC DEFINITIONS OF MODELS
BCK FLG - BACKUP FLAGS INDICATING WHAT BACKUPS FOLLOW AND A REDUNDANT/INITIAL COPY FLAG

FIG. 12B

| 32H | 04H | SEQ NUM | SEQ NUM | DAT TYP | DATA BYTES (21 BYTES) | CHK SUM |

DAT TYPE - BACKUP DATA TYPE (OF DATA THAT FOLLOWS)
00 - SYSTEM CONFIGURATION DATA
01 - DEALER SCREEN
10 - DATABASE GLOBAL DATA
11 - DATABASE SATELLITE RECORDS
12 - DATABASE CHANNEL RECORDS
20 - FAVORITE VIDEOS/PROGRAMS
21 - FAVORITE AUDIOS
80 - ADDRESSABLE DATA (MAY NOT BE NEEDED)

FIG. 12C

| 32H | 05H | SEQ NUM | SEQ NUM | CONTINUATION OF PREVIOUS DATA PACKET (04) (21 BYTES) | CHK SUM |

FIG. 12D

| 32H | 06H | SEQ NUM | SEQ NUM | HRZ POS | VRT POS | MESSAGE DISPLAYED ON RIGHT HALF (UP TO 13 CHARS, NULL TERMINATED) | CHK SUM |

HRZ/VRT POS - HORIZONTAL/VERTICAL POSITION OF MESSAGE

FIG. 12E

| 32H | 07H | SEQ NUM | SEQ NUM | DATA BYTES, UNUSED (21 BYTES) | CHK SUM |

FIG. 12F

| 00H | NUM VRS | VAR ID | VAR TYP | VAR LEN | VAR DAT | .... | VAR DAT | VAR ID | .... | VAR ID | .... |

NUM VRS - NUMBER OF VARIABLES IN PACKET
VAR ID  - VARIABLE IDENTIFIER
VAR TYP - VARIABLE TYPE
        00 - UNSIGNED BYTE (CHAR)
        01 - SIGNED BYTE
        02 - UNSIGNED WORD (INT)
        03 - SIGNED WORD
        04 - UNSIGNED LONG (LONG INT)
        05 - SIGNED LONG
        06 - FLOAT
        07 - DOUBLE FLOAT
        8X - ARRAY OF THE ABOVE TYPES
VAR LEN - LENGTH OF VARIABLE IN BYTES
VAR DAT - THE VARIABLE DATA

FIG. 13A

| 01H | DLR TYP | LEN | ASCII SCREEN CHARS OR ASSOCIATED CHAR ATTRIBUTES |

DLR TYP - TYPE OF DEALER DATA
        00 - TEXT
        01 - ATTRIBUTES (COLOR, ETC.) [MAY NOT BE USED]
LEN     - LENGTH OF THE DEALER DATA IN BYTES

FIG. 13B

| 10H | SAME AS SYSTEM CONFIGURATION DATA |

FIG. 13C

| 11H | UNDEFINED |

FIG. 13D

| 12H | UNDEFINED |

FIG. 13E

| 20H | FAV NUM | SAT | CHN | CAT | FAVORITE NAME (UP TO 15 CHAR, NULL TERMINATED) | TRM 00H |

FAV NUM - FAVORITE PROGRAM NUMBER
SAT      - FAVORITE SATELLITE
CHN     - FAVORITE CHANNEL
CAT      - FAVORITE CATEGORY

FIG. 13F

| 21H | FAV NUM | SAT | CHN | CAT | FAVORITE NAME (UP TO 15 CHAR, NULL TERMINATED) | TRM 00H |
|---|---|---|---|---|---|---|

FAV NUM - FAVORITE AUDIO NUMBER
SAT     - FAVORITE AUDIO SATELLITE
CHN     - FAVORITE AUDIO CHANNEL
CAT     - FAVORITE AUDIO CATEGORY

| LFT FRQ | LFT FRQ | RGT FRQ | RGT FRQ | ATR | |
|---|---|---|---|---|---|

LFT FRQ - LEFT AUDIO FREQUENCY
RGT FRQ - RIGHT AUDIO FREQUENCY
ATR     - AUDIO ATTRIBUTES (NARROW/WIDE, ETC.)

FIG. 13G

| 80H | ADR 1 | ADR 2 | ADR 3 | LEN 1 | LEN 2 | LEN 3 | DATA (UP TO 14 BYTES) |
|---|---|---|---|---|---|---|---|

ADR1-3 - ABSOLUTE ADDRESS OF DATA (ADR1 = 00, IF NOT USED)
LEN1-3 - SIZE OF DATA BLOCK IN BYTES (LEN1 = 00, IF NOT USED)

FIG. 13H

```
HEADER PACKET              (SEQ NUM 00)
HEADER PACKET              (00) [TWO REDUNDANT COPIES]
HEADER PACKET              (00)
GAP PACKET                 (01)
GAP PACKET                 (01)
GAP PACKET                 (01)
       .
       .
       .
GAP PACKETS                (M)
DATA PACKET                (M+1)
DATA PACKET                (M+1)
DATA PACKET                (M+1)
GAP PACKETS                (M+2)
       .
       .
       .
DATA CONTINUATION PACKET   (N)    [IF NECESSARY]
DATA CONTINUATION PACKET   (N)
DATA CONTINUATION PACKET   (N)
GAP PACKETS                (N+1 ... O-1)
       .
       .
       .
DATA PACKETS               (O)
GAP PACKETS                (O+1)
DATA CONTINUATION PACKETS  (O+2)  [IF NECESSARY]
GAP PACKETS                (O+3 ... P-1)
       .
       .
       .
TRAILER PACKET             (P)
TRAILER PACKET             (P)
TRAILER PACKET             (P)

HEADER PACKETS
GAP PACKETS
DATA PACKETS
GAP PACKETS
DATA CONTINUATION PACKETS  [IF APPLICABLE]
GAP PACKETS
       .
       .
TRAILER PACKETS
```

—INITIAL WRITE

—TWO REDUNDANT COPIES

FIG. 14C

SATELLITE RECEIVER WITH IMPROVED MEMORY BACK-UP AND LOADING CAPABILITIES

BACKGROUND OF THE INVENTION

1. Field of the Invention

The present invention relates to satellite receivers for television signals and, in particular, to the back-up of information contained in the memory associated with the satellite receiver and the loading of information in the satellite receiver's memory.

2. Description of the Related Art

Presently, television signals are transmitted from one earth location to another earth location via geostationary satellites that all orbit in a defined belt and with a defined altitude above the earth. (Television signals are also transmitted by satellites that are in polar and inclined orbits.) At substantially any location in the continental United States, the television signals from approximately ten geostationary satellites, which each provide twenty-four television channels, can be received. While the geostationary satellites exist in a defined belt over the earth, the position of the belt or arc, and hence each satellite, varies according to one's location. For example, if the geostationary satellites were all to orbit at a specified altitude over the equator, then the altitude of the belt, as one moves north or south in latitude, would decrease with respect to the latitudinal horizon.

The typical home system for receiving satellite television signals includes a dish antenna whose position can be altered to receive television signals from a selected one of the plurality of geostationary satellites whose signals are accessible from the antenna's location. Further included in the typical home system for receiving satellite television signals is a satellite receiver, which is sometimes referred to as integrated receiver descrambler (IRD). The satellite receiver includes the componentry for controlling the position of the antenna so that a selected television signal can be received from the appropriate one of the plurality of geostationary satellites. The satellite receiver also includes circuitry for processing the received signal, i.e., descrambling, filtering, and otherwise conditioning the received signal, and then providing the post-processed signal to the user's television.

As previously mentioned, the position of the belt or arc within which the geostationary satellites exist relative to a particular location varies with the location. (A similar situation exists for satellites in polar and inclined orbits.) Consequently, when a satellite receiver system is installed, the locations of the geostationary satellites must be programmed or otherwise taught to the satellite receiver so that the receiver can position the antenna to receive the television signals provided by each of the geostationary satellites. It is not uncommon for the programming of a satellite receiver with the locations of the accessible geostationary satellites to require half an hour of time.

Presently, it is quite common to occasionally lose the satellite position information that has been programmed into a satellite receiver due to, for example, a loss of power. As a consequence, the satellite receiver must be reprogrammed. This can be quite time consuming, especially if the locations of several satellites must be reprogrammed into the satellite receiver.

This problem is further exacerbated by the fact that many satellite receivers allow the user or the installer to program the receiver to perform other functions besides positioning the antenna. For example, some satellite receivers allow the user to program the receiver with the necessary information to position the antenna to receive the user's favorite television broadcast and the optimized polarizer settings for all satellites and channels. This information, like the satellite's position, must be reprogrammed if it is lost due to a power failure or some other catastrophe.

Another problem with present satellite receivers is that updating the receiver's memory with, for example, new software programs that implement new features typically requires opening the receiver's casing and swapping the old memory chips for new memory chips that contain the new software programs. This can be very time consuming and, in many instances, this or some other updating operation requires the user to return the receiver to the manufacturer, dealer, or installer, thereby depriving the user their satellite system for a considerable amount of time.

SUMMARY OF THE INVENTION

An object of the present invention is to provide a satellite receiver that addresses the problem of loss of operational information from the satellite receiver's memory.

Another object of the present invention is provide a satellite receiver that is less time consuming to reprogram in the event that operational information is lost from its memory.

Yet a further object of the present invention is to provide a satellite receiver whose memory can be readily updated with new operational information, such as new software programs or new satellite information that implement new features.

A further object of the present invention is to provide a satellite receiver that can be updated with new information, such as new software programs for implementing enhanced features without having to return the satellite receiver to a servicing center, dealer, or manufacturer.

These and other objects are addressed by the present invention. Specifically, it was recognized that a substantial percentage of home satellite receiver systems include a video signal recording/playback device or, more specifically, a video cassette recorder (VCR). However, the information in the memory of a satellite receiver is in a digital format, while the information recorded and/or played back with a VCR is in a video format, i.e., a television signal format. The present invention adapts the satellite receiver so that digital information stored in memory can be recorded by a VCR for backup and/or information provided by a VCR can be loaded into the memory of the satellite receiver.

One embodiment of the television signal satellite receiver of the present invention includes a digital memory for storing information in a digital format. The information can include satellite position information (geostationary, inclined, or polar), information on the user's favorite programs, and software programs that are used by the satellite receiver to implement various functions. Also included in the satellite receiver of the present invention is a device for communicating a video or television signal with a video cassette recorder (VCR). A device is also provided for translating information between the digital format of the satellite receiver's memory and the video or television signal format utilized by a VCR. This allows the digital information in the receiver's digital memory to be backed up using the VCR because the digital information can now be placed in the television signal format used by the VCR. Conversely, the translating device can decode or recover digital information that has been encoded or embedded in a television signal provided by the VCR and then load the recovered digital information in the digital memory of the satellite receiver. Consequently, the present invention provides the ability to back-up digital information contained in a satellite receiver using the VCR and to establish digital information in the satellite receiver that has been encoded in a television signal provided by the VCR.

Another embodiment of the television signal satellite receiver of the present invention is capable of employing the user's television as an output device for providing the user with data on the use of the VCR to back up or load the satellite receiver's memory. For example, textual data can be provided to the television that instructs the user on the sequence of operations necessary to back up information stored in the satellite receiver's memory or to retrieve information from the VCR for loading into the memory.

Among the advantages of the satellite receiver of the present invention is that information in the satellite receiver's memory can be backed up so that in the event this information is lost, there is a record that can be used to restore the information to the memory. Further, the satellite receiver of the present invention provides the ability to relatively quickly restore information previously backed up using the video signal recording device to the memory of the satellite receiver. Additionally, the present invention provides a satellite receiver that can be readily updated with new information, such as software programs that implement new satellite receiver functions. Moreover, the satellite receiver of the present invention is relatively easy to use and can be implemented with componentry that has a relatively small impact on the overall production costs of the satellite receiver.

BRIEF DESCRIPTION OF THE DRAWINGS

FIG. 12B illustrates a header data packet;

FIG. 12C illustrates a data packet;

FIG. 12D illustrates a data continuation packet;

FIG. 12E illustrates a message packet;

FIG. 12F illustrates a trailer packet;

FIG. 13A illustrates a system configuration data packet;

FIG. 13B illustrates a dealer screen data packet;

FIG. 13C illustrates a database global data-data packet;

FIG. 13D illustrates a database satellite records data packet;

FIG. 13E illustrates a database channel records data packet;

FIG. 13F illustrates a favorite videos/programs data packet;

FIG. 13G illustrates a favorite audios data packet;

FIG. 13H illustrates an addressable data-data packet;

FIG. 14C is an example of the data packets transferred during a data backup session;

DETAILED DESCRIPTION OF AN EMBODIMENT OF THE INVENTION

Figure 1:
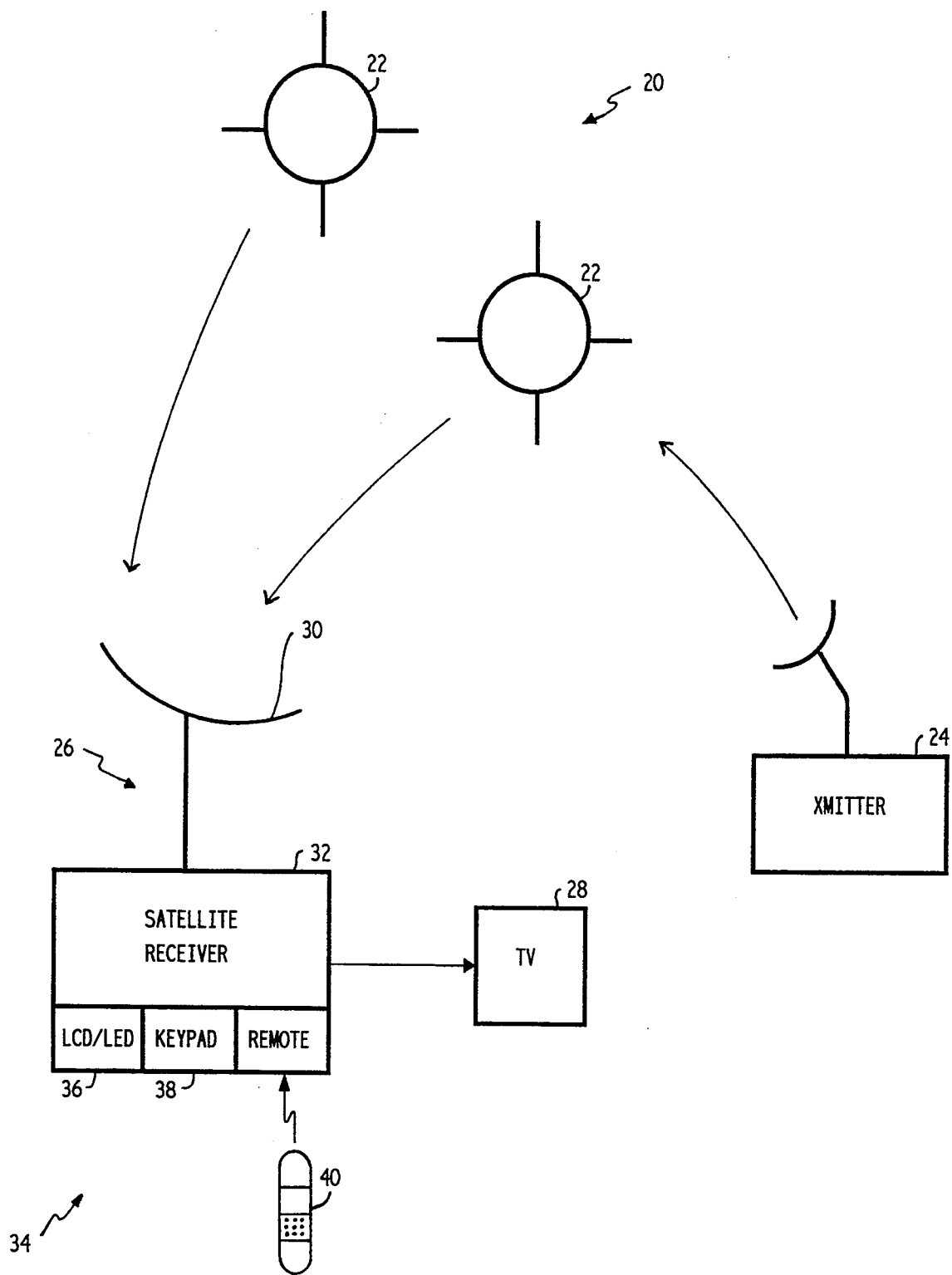
FIG. 1 illustrates a typical television satellite system.

A typical satellite television system 20 is illustrated in FIG. 1. The satellite television system 20 includes a plurality of television signal relay satellites 22 that each receive one or more television signals from an Earth-based transmitting station 24 or other satellite and then broadcast these television signals back to Earth so that a consumer satellite television signal reception system 26 can receive one of these television signals and perform the necessary processing on the television signal so that it can be applied to a television 28.

The consumer satellite television reception system 26, which is hereinafter referred to simply as the reception system 26, includes an antenna 30 for receiving the television signals broadcast by the satellites 22. Typically, the antenna 30 is moveable so that it can be focused on one satellite 22 and thereby receive the television signals broadcast by the selected satellite to the exclusion of the television signals broadcast by other satellites. The television reception system 26 further includes a receiver 32 that processes a selected one of the television signals provided by the antenna 30 so that the selected television signal can be applied to the television 28. Normally, this processing involves amplification, descrambling, and filtering of the selected television signal. The receiver 32 also includes a user interface 34 that allows a user to interact with the receiver 32. The user interface 34 typically includes a visual display, such as an LCD/LED 36, that allows the receiver 32 to communicate with the user and a switch array or keypad 38 that allows the user to communicate with the receiver 32. The user interface 34 also typically includes a remote handset 40 that permits the user to communicate with the receiver 32 remotely and thereby avoid having to directly contact the keypad 38.

The receiver 32, in addition to processing the television signals broadcast by the satellites 22, also typically operates to position the antenna 30 to receive the television signal selected by the user. The position of the satellite 22 varies with the location of the television reception system 26 and, more specifically, with the location of the antenna 30. Consequently, since the location of the television reception system 26 is generally not known when the television reception system 26 is manufactured, it is not possible to preprogram the satellite location information into the receiver 32. Consequently, the satellite location information must be programmed into the receiver 32 at the time of installation. Typically, this programming involves initiating the execution of a satellite location program and interacting with the executing program via the user interface 34. The satellite location information, once determined for a particular location of the antenna 30, is stored in a programmable memory located in the receiver. The receiver 32 also allows the user to input other programmable information into the receiver 32 that, like the satellite position information, is stored in the programmable memory. For instance, the receiver 32 also typically allows the user to program the receiver via the user interface 24 to receiver user's favorite television program.

The programmable memory used to store the programmable information is typically a random access memory (RAM) that stores information in a digital format. Further, to address the cost constraints imposed by the consumer market, the RAM is typically a volatile RAM. Consequently, if power to the volatile RAM is interrupted by, for example, the satellite receiver 32 becoming disconnected from a power outlet or a battery back-up failure, the information stored in the volatile RAM can be lost. Another way that information in the volatile RAM can be lost is by consumer or installer errors when storing information in the RAM. The receiver 32 must then be reprogrammed, typically a tedious and time-consuming operation.

Figure 2:
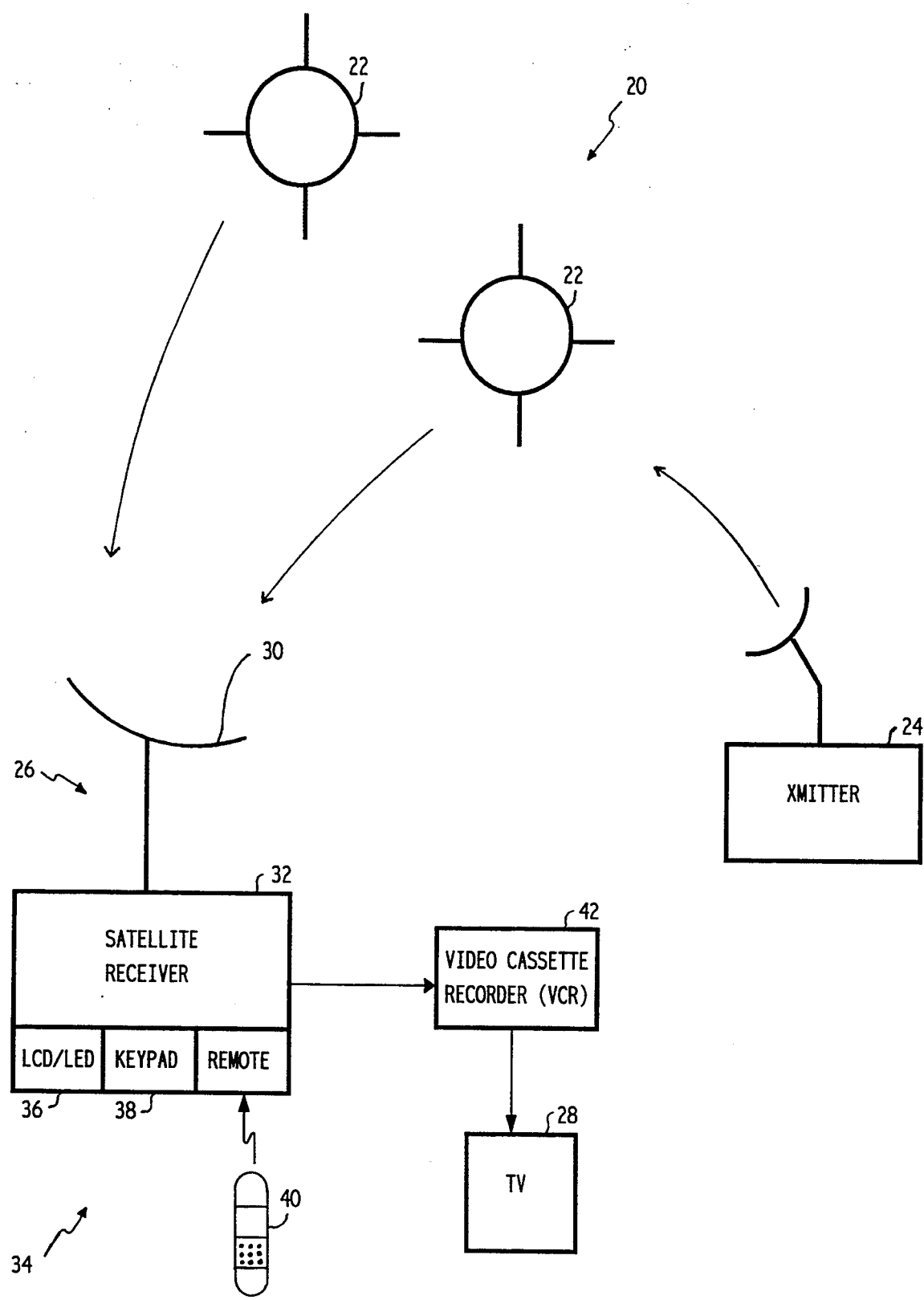
FIG. 2 illustrates another embodiment of a television satellite system that includes a video cassette recorder (VCR) in addition to the components identified in FIG. 1.
Figure 3:
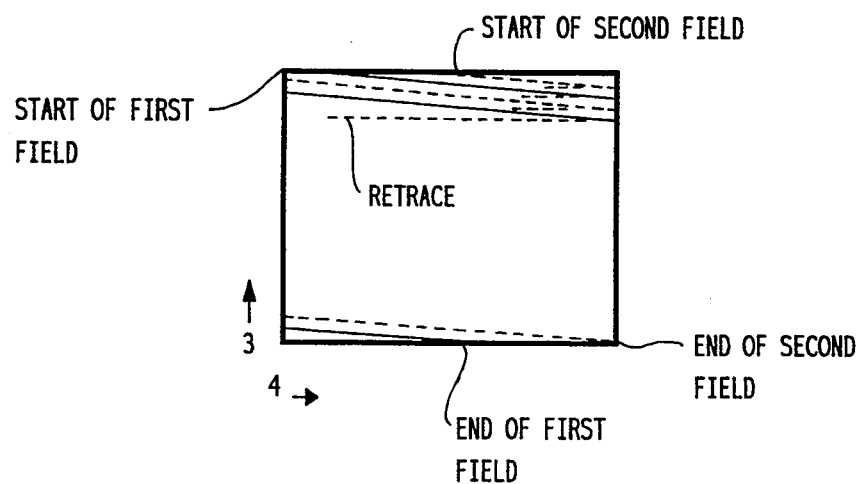
FIG. 3 illustrates the first and second fields that are interlaced to realize a television picture according to the standard established by the National Television System Committee (NTSC)
Figure 4A:
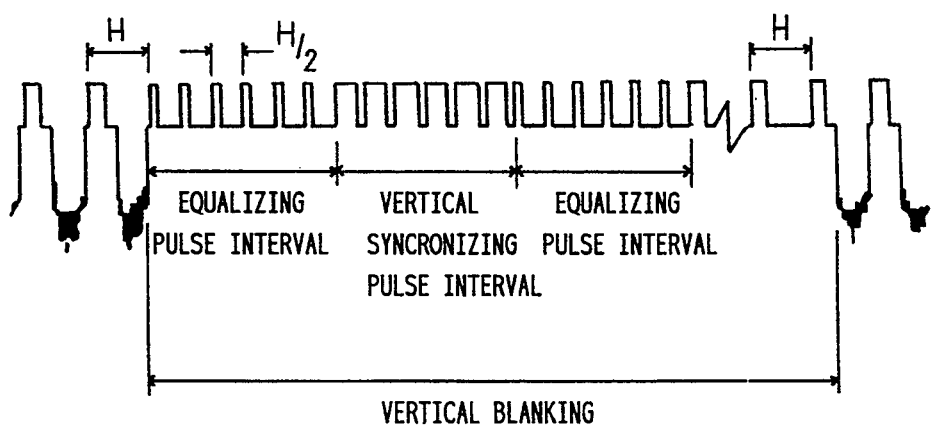
FIGS. 4A and 4B illustrate the vertical blanking signals that are used to vertically synchronize the tracing of the first and second fields comprising the NTSC television picture illustrated in FIG. 3.
Figure 4B:
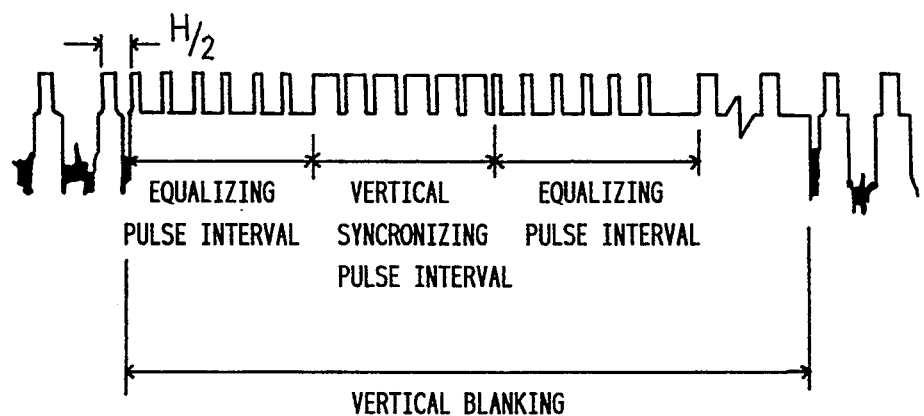

It is the possible loss of information that the present invention seeks to address. Specifically, and with reference to FIG. 2, it was realized that a high percentage of consumers had incorporated a television signal recording device and, more specifically, a video cassette recorder (VCR) 42 into their satellite television reception system for recording television signals provided by the satellite receiver and later playing back of the recorded television signals on the television 28. Consequently, an information recording device, the VCR 42, was present with the receiver 32 in many instances. The VCR 42 is, however, adapted to record and output television signals, which have a specific format.

The present invention is directed to an improved receiver that is capable of encoding or embedding programmable or volatile digital information into a television system format that can be recorded using the VCR 42 and, if desired, viewed on the user's television 28. This recorded information can then be played back from the VCR 42 and decoded or recovered from the television signal format by the receiver if, for some reason, the digital information in the receiver becomes lost or otherwise compromised. Alternatively, new digital information, such as a program for a new or enhanced feature for the receiver 32, can be established on a VCR tape and played back to the receiver to install the new or enhanced feature.

With reference to FIGS. 3–6, the format of a television picture signal constructed according to the National Television System Committee (NTSC) standard is described. (It should be appreciated that the present invention can be used with television picture signals constructed according to other standards, such as the Phase Alteration Line (PAL) standard used in Germany and the Sequential-and-Memory (SECAM) standard used in France and Russia.) Specifically, a NTSC television picture signal is comprised of 525 horizontal scan lines that are equally divided into a first field of odd numbered horizontal scan lines and a second field of even numbered horizontal scan lines. During operation of a television, the first field is scanned from the top to the bottom of the television screen, and then the second field is likewise scanned from the top of the television screen to the bottom of the television screen. Of the 525 horizontal scan lines, 109 of the horizontal scan lines are dedicated to borders at the top and bottom of the picture and what is known as the vertical blanking interval, the time between the end of the displayable portion of the first field and the displayable portion of the second field. The displayable portions of the first and second fields are each comprised of 208 horizontal scan lines. FIGS. 4A and 4B illustrate the format of the horizontal scan lines comprising the vertical blanking intervals that follow the displayable portion of the first field and the displayable portion of the second field. The information contained in the horizontal scan lines associated with the vertical blanking interval is used by a television to properly synchronize the mechanisms that are responsible for displaying the picture on a television tube and, as a consequence, are not available for other uses.

Figure 5:
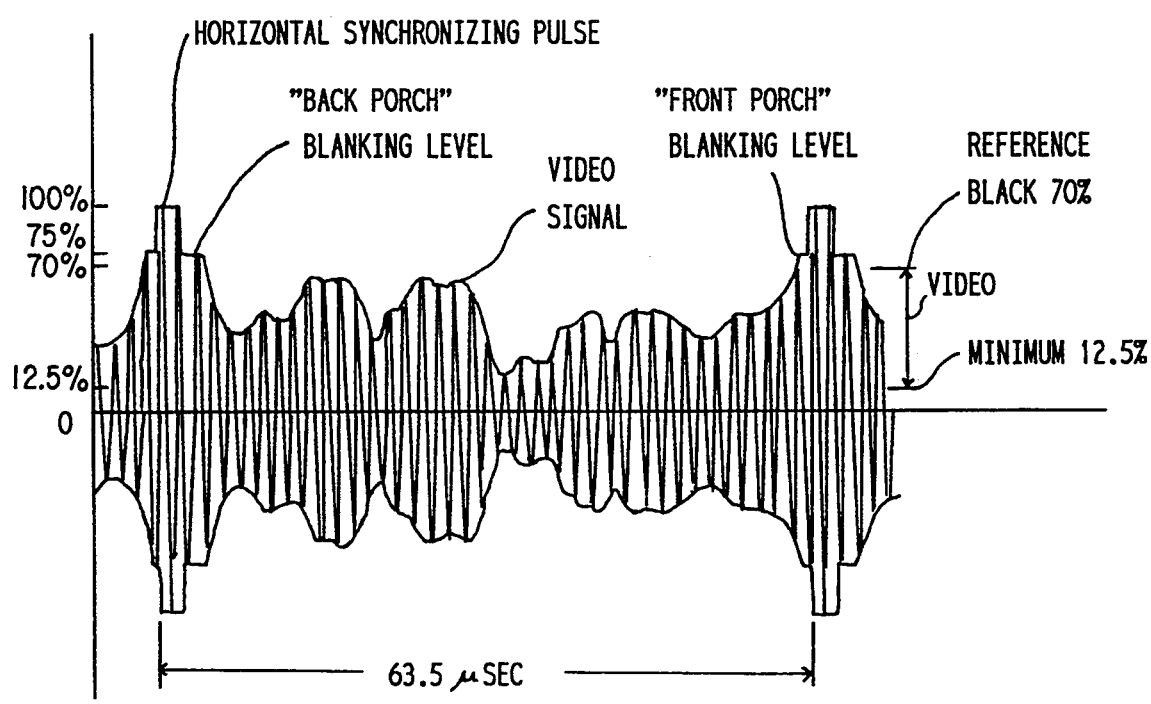
FIG. 5 is an example of the television signal associated with a single scan line of a NTSC television picture.
Figure 6:
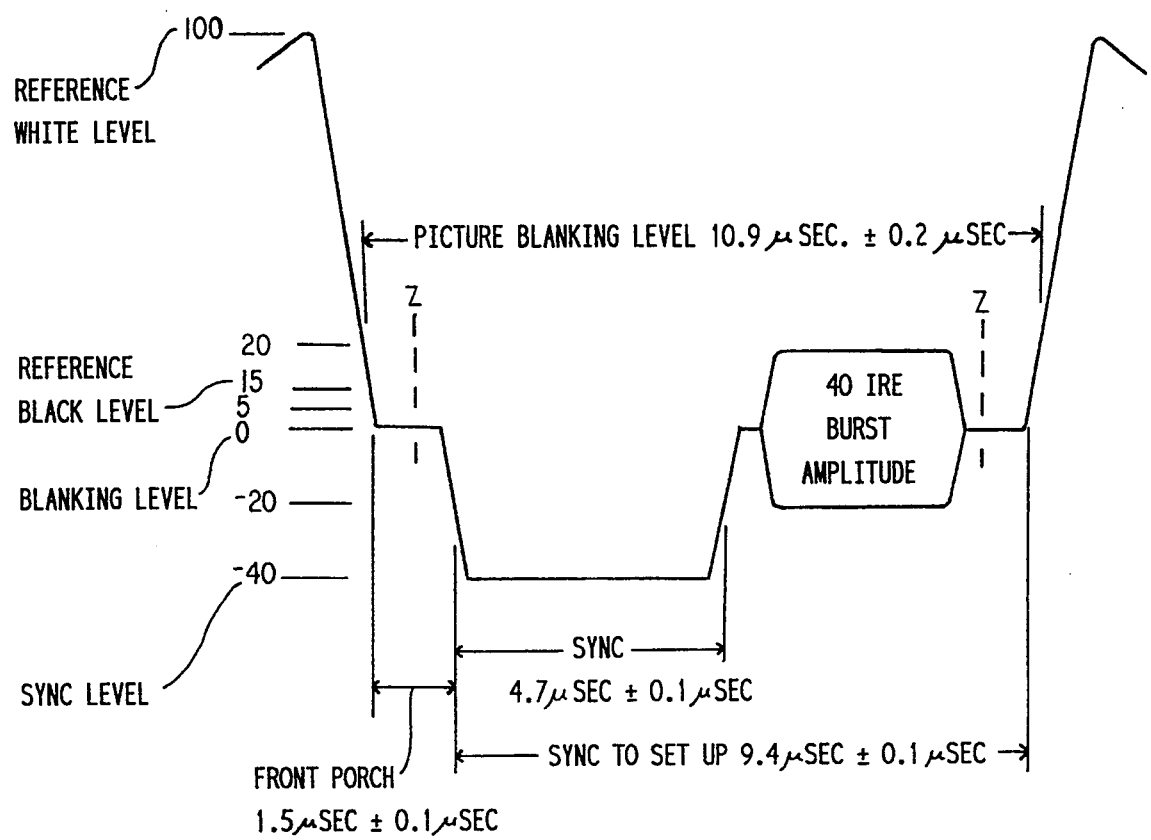
FIG. 6 illustrates various portions of a television signal and, more specifically, the levels of a television signal that are used to produce a white picture and a black picture in a NTSC television picture.

FIG. 5 is an example of a single horizontal scan line. The horizontal scan line is comprised of a "front porch" blanking portion, a horizontal synchronization pulse, and a "back porch" blanking portion that are also used to properly synchronize the apparatus responsible for displaying the picture on the television tube and, as with the vertical blanking interval, are not available for other purposes.

Located intermediate the horizontal synchronization pulses is a video signal that defines a horizontal scan line's worth of the picture displayed on a television tube and viewable by a user. It is this portion of the television signal that the satellite receiver of the present invention utilizes to backup programmable or volatile digital information contained in the receiver 32 or to load the memory of the receiver 32 with digital information. More specifically, the video signal is comprised of a chromiance portion that includes red, green, and blue signals that define the color portion of a television picture. The video signal is also comprised of a luminance portion that determines the brightness of a television picture and has a range that extends between white and black. A white picture having a signal level of 100 IRE and black picture having a signal level of 15 IRE.

The present invention utilizes the horizontal scan lines and the black and white signal levels in a television picture signal to encode digital information stored in the receiver so that the information can be applied to a VCR for data backup. Specifically, each horizontal scan line of the first field and the corresponding or adjacent horizontal scan line of the second field are defined to correspond to one bit of digital information. If desired or appropriate, a bit can be defined to correspond to a single horizontal scan line or a portion of a single horizontal scan line so that several bits can be placed in the single horizontal scan line. The luminance signal levels of the pair of horizontal scan lines that represent a bit of digital information are defined to represent the state of a digital bit, "0" or "1." More specifically, a bit with a "0" state is defined to correspond to the white signal level and a bit with the "1" state is defined to correspond to the black signal level. These conventions can, of course, be reversed if desired.

Since the available portion of each television picture signal is comprised of 208 horizontal scan lines in each of the first and second fields, and each bit corresponds to a horizontal line in the first and second fields, each television picture signal is capable of being encoded with 208 bits or 26 bytes of digital information.

Based upon the foregoing conventions, the receiver 32 of the present invention has the ability to encode digital information into a television picture signal that can be applied to the VCR 42 to backup the digital information and thereby provide a record of the programmable or volatile digital information contained in the satellite receiver 32. If necessary, the encoded television picture signal can also be displayed on the television 28. Conversely, the satellite receiver 32 can use a television picture signal provided by the VCR 42 that has been encoded with digital information and decode or recover this information to load the satellite receiver's memory with previously backed up information or new information if desired.

Figure 7:
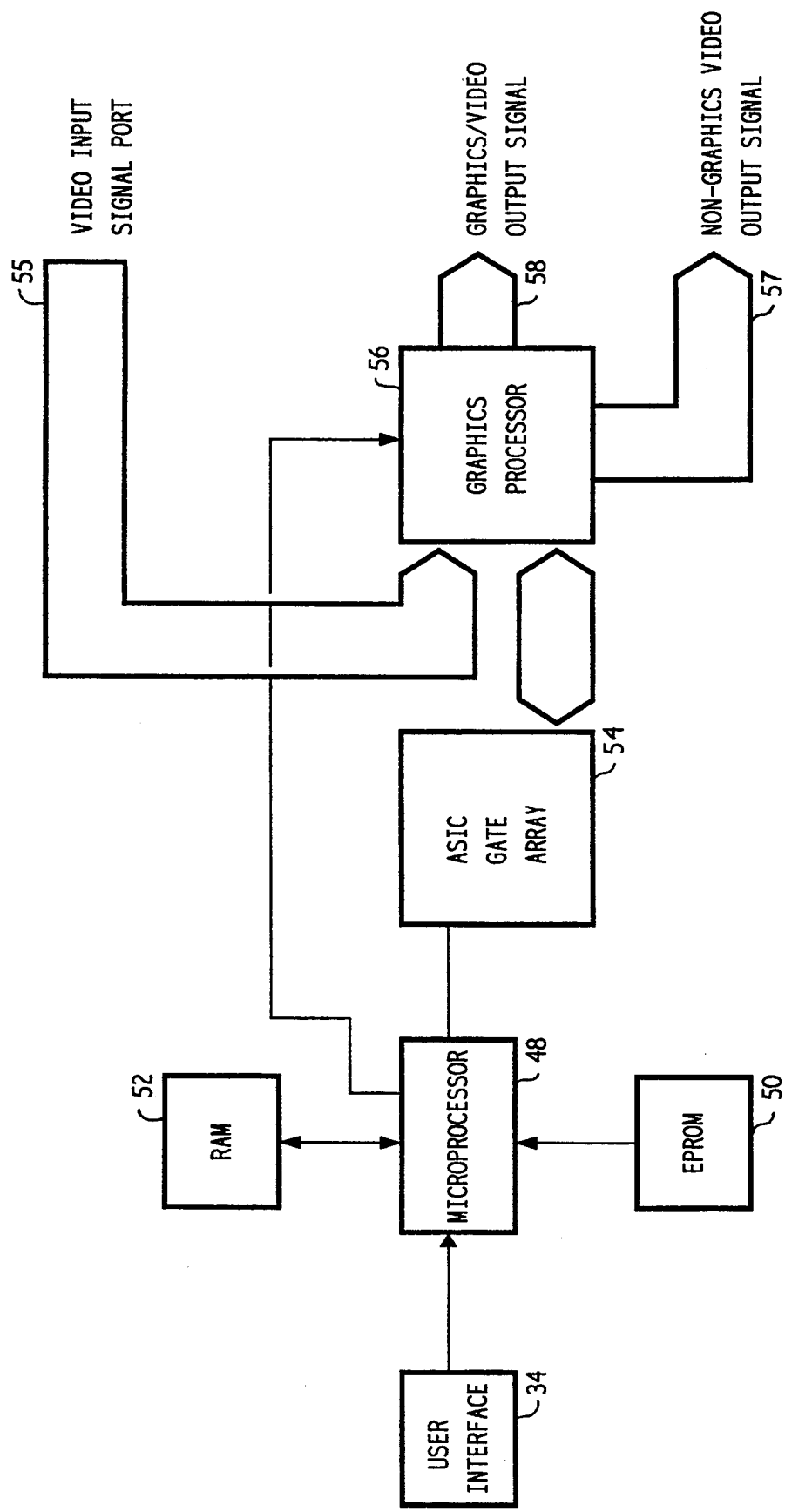
FIG. 7 is a block diagram of the circuitry used to encode digital information stored in the satellite receiver into a television picture signal.

With reference to FIG. 7, the portion of the receiver 32 of the present invention that is responsible for encoding digital information into a television signal format, hereinafter referred to as encoding portion 46, is illustrated. The encoding portion 46 includes a microprocessor 48 that, among other things, controls the encoding operation according to a program stored in erasable programmable read-only memory (EPROM) 50. The microprocessor 48 executes the encoding program in response to a command received from the user interface 34. Essentially, the encoding program executed by the microprocessor 48 causes 26 bytes of digital information, such as satellite location information, that have been stored in a volatile RAM 52 to be output to the microprocessor 48. The microprocessor in turn, then applies the digital information to a gate array 54 that assembles a television picture signal in which 26 bytes of digital information are encoded in the television signal as previously described, i.e., with pairs of horizontal scan lines from the first and second fields corresponding to a bit of information and the luminance levels of the horizontal scan lines corresponding to the state of the bit. In addition, the gate array 54 assembles the required vertical blanking portion and horizontal synch pulses required of a television picture signal. Once assembled, the television picture signal is, via a graphics processor 56, applied to a graphics/video output signal port 58 that can be connected to the input port of the VCR 42 to record the encoded television picture signal.

Figure 8:
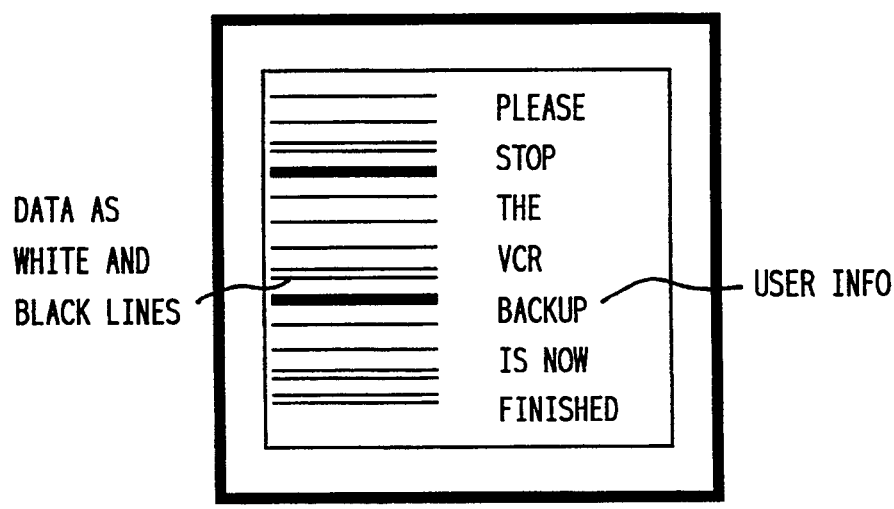
FIG. 8 is an example of the television picture viewed by a user during a data backup operation, the picture being comprised of a data portion and a user information portion.

The graphics processor 56 inserts graphics information, such as instructional information for the user on performing a data backup, into the second half of each of the horizontal scan lines to produce a composite graphics/video signal that is applied to a graphics/video output signal port 58. The composite graphics/video output signal can be applied to the television 28, via the VCR 42, to produce a television picture, as shown in FIG. 8, with half of the picture displaying the black and white lines representative of the information being stored on the VCR 42 and the other half of the picture providing instructional information to the user. The composite graphics/video output signal thereby confirms to the user that digital data is being stored on the VCR and instructs or otherwise informs the user concerning the status of the data backup operation.

Since there is the possibility that some of the digital information may be incorrectly decoded when retrieved from the VCR 42, the encoding portion 46 produces at least two and preferably three television picture signals with the same digital information, each of which includes a checksum byte for error detection. The checksum byte provides a basis for detecting an error when the digital information is recovered from a television signal provided by the VCR 42 and the redundant television picture signals provide a way for recovering the digital information if it cannot be recovered from one of the television picture signals.

Figure 9:
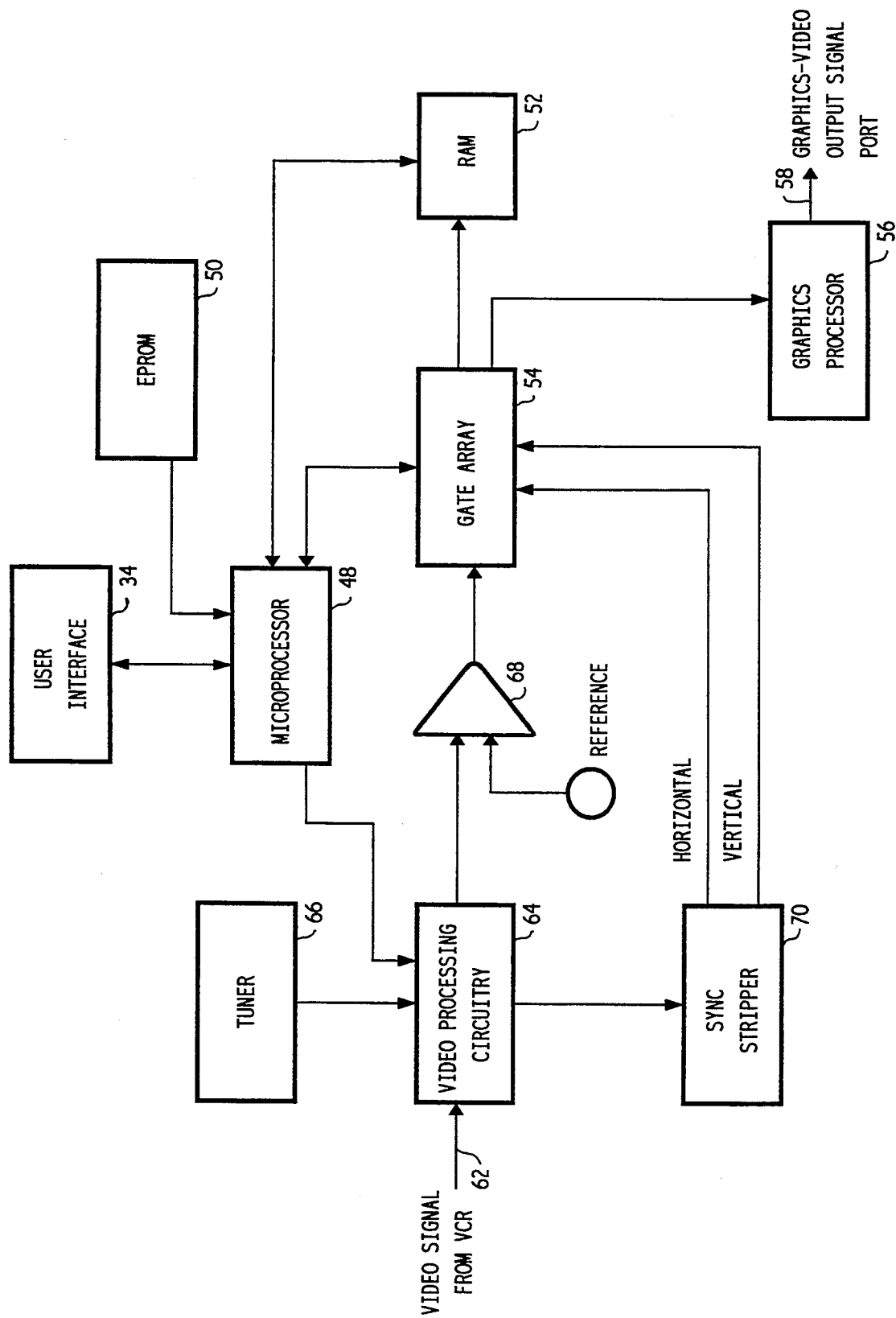
FIG. 9 is a block diagram of the circuitry in the satellite receiver for receiving a television picture signal from a VCR that has been encoded with digital information to be stored in the satellite receiver and decoding the television picture signal to retrieve the digital information.

FIG. 9 illustrates the portion of the receiver 32 for decoding or recovering digital information from a television picture signal provided by the VCR 42 so that the digital information can be applied to the RAM 52. Hereinafter, this portion of the receiver 32 will be referred to as the decoding portion 60. The decoding portion 60 includes several elements that are common with the encoding portion 46 and, as a consequence, the same reference numbers have been retained. The decoding portion 60 includes the microprocessor 48 for directing the other elements of the decoding portion 60 in recovering digital information from an encoded television signal provided by the VCR 42. The microprocessor 48 operates according to a decoding program contained in the EPROM 50 and initiates a decoding operation pursuant to a directive provided over the user interface 34.

The decoding portion also includes an input port 62 for receiving a graphics video signal from the VCR 42 and applying the signal to video processing circuitry 64 that is tuned to the channel frequency of the graphics video signal, typically Channel 3, according to a video tuner 66. (An alternative way to transfer the video signal from the VCR 42 to the video processing circuitry 64 is via composite video inputs. The processing circuitry performs various operations on the received graphics video signal, such as filtering and amplification. The processed video signal output by the video processing circuitry 64 is applied to a comparator 68 that compares the video signal to a reference signal to produce a digital bit stream, which has a digital "0" signal level or a digital "1" signal level, depending upon the comparison. For example, if the video signal is greater than the reference signal, the comparator 68 outputs a digital "1" signal level and if the video signal is less than the reference signal, the comparator outputs a digital "0" signal level. The digital bit system output by the comparator 68 is applied to the gate array 54 for further processing.

The video signal output by the video processing circuitry 64 is also applied to a sync stripper 70 that identifies those portions of the video signal associated with horizontal and vertical synchronization and provides signals indicative of the occurrence of these signals to the gate array 54. More specifically, the sync stripper 70 identifies the occurrence of the "front porch," horizontal synchronization pulse, and "back porch," signals associated with horizontal synchronization and provides a signal indicative of the occurrence of these signals to the gate array 54. Similarly, the sync stripper 70 identifies the occurrence of the vertical blanking interval in the video signal and provides a signal indicative of the occurrence of this portion of the video signal to the gate array 54.

The gate array 54, under the direction of the microprocessor 48, processes the digital bit system output by the comparator 68 to remove those portions of the digital bit stream that are associated with horizontal and vertical synchronization and thereby recover the digital information. In addition, the gate array 54 produces a composite graphics-video television signal using the graphics processor 56 that is applied to the graphics-video output signal port 58. This composite signal can then be applied to the television 28 to provide confirmation to the user that the digital information encoded in the television picture signal being input to the receiver 32 is being recovered and loaded into the RAM 52, as well as to instruct or inform the user on the loading operation.

Once the digital information has been recovered, the gate array 54 provides the digital information to the microprocessor 48 which uses the checksum to identify errors in the digital information. If there are no errors, the microprocessor 48 loads the digital information into the RAM 52. If, on the other hand, errors are present, the microprocessor 48 attempts to recover the digital information from one of the redundant television picture signals. If the digital information cannot be recovered from any of the redundant television picture signals, the microprocessor 48 utilizes the graphics processor 56 to generate a television picture signal that is applied to the television 28 and informs the user of the error.

Figure 10:
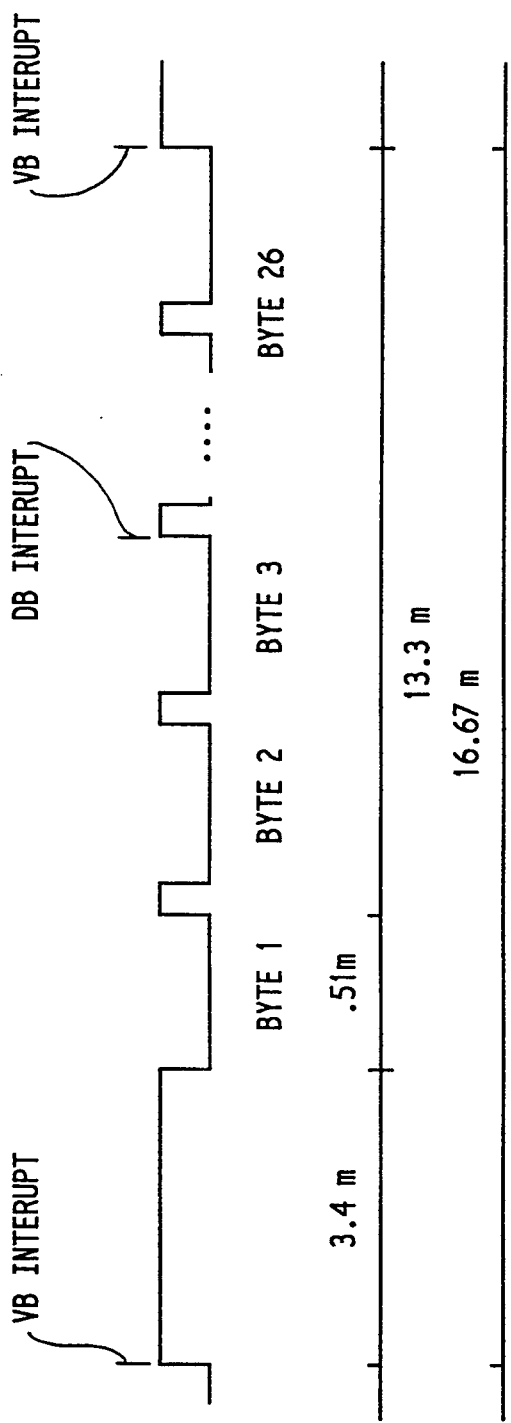
FIG. 10 illustrates how 26 bytes of the satellite receiver's operational information are encoded in one of the first and second fields of a television picture.

As previously mentioned, the encoding portion 46 of the receiver 32 operates during an encoding operation to build a television picture signal that includes 26 bytes of information. Conversely, the decoding portion 60 of the receiver 32 operates to recover 26 bytes of information from each television picture signal provided by the VCR 42. FIG. 10 graphically illustrates the composition of a single field of a television picture signal that contains 26 bytes of information. The 26 bytes of information are hereinafter referred to as a data packet.

Figures 11, 12A:
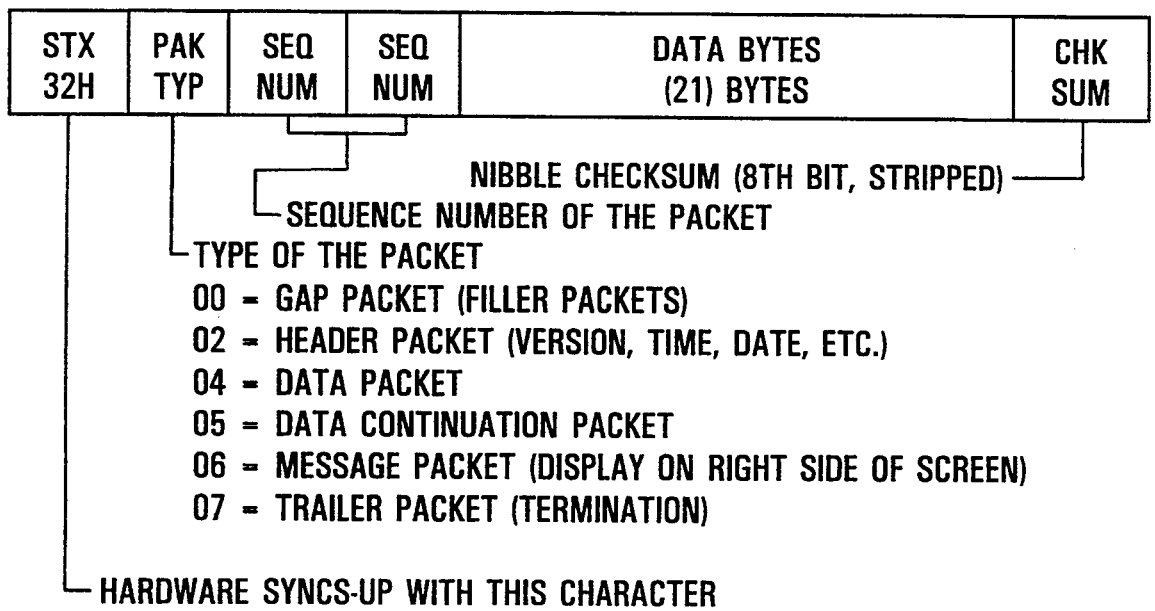
FIG. 11 illustrates the format of a 26 byte data back up standard definition packet.
FIG. 12A illustrates a gap packet.

FIG. 11 defines the composition of a typical data packet and, more specifically, identifies the purpose of each byte in the data packet. The first byte of each data packet contains a unique digital code that during a loading or decoding operation can be used to identify the beginning of the packet. Stated another way, the first byte contains a synchronization signal that allows the decoding hardware to initialize counters and the like that are used in the decoding of the remainder of the packet. The second byte of the data packet identifies the type of data packet. Presently, the types of data packets include a gap packet that is used as a time filler to allow the decoding hardware and software time to perform certain functions if necessary; a header packet that identifies the start of a group of related packets and a corresponding trailer packet that identifies the end of a related group of data packets; a data packet that can be any of a number of various subtypes of data packets; a data continuation packet that is used if a single data packet is inadequate for a particular situation; and a message packet that can be used by the graphics processor 56 to generate the text portion of the composite graphics/video signal that is applied to the television 28 to instruct or inform the user on the data back-up or loading operations. The third and fourth bytes are used to define the sequence of the data packet in a group of related data packets. The twenty-one bytes following the sequence number bytes are used to store information contained in the RAM 52. The last byte in a data packet is used as a checksum for error detection during a loading operation. More specifically, during a loading operation a checksum is generated as the digital information is decoded. If this checksum does not correspond with the checksum in the last byte of the data packet, then a decoding error has occurred and the appropriate action is taken.

FIGS. 12A–12F illustrate the formats of the various types of data packets. With reference to FIG. 12C, the format of a data packet is shown. The fifth byte of a data packet is used to identify the subtype of data contained in the following 20 bytes. Presently, the data types include system configuration data, a dealer screen, database global data, database satellite records, database channel records, favorite video/programs, favorite audios, and addressable data. The formats of each of these data types are illustrated in FIGS. 13A–13H.

Figure 14A:
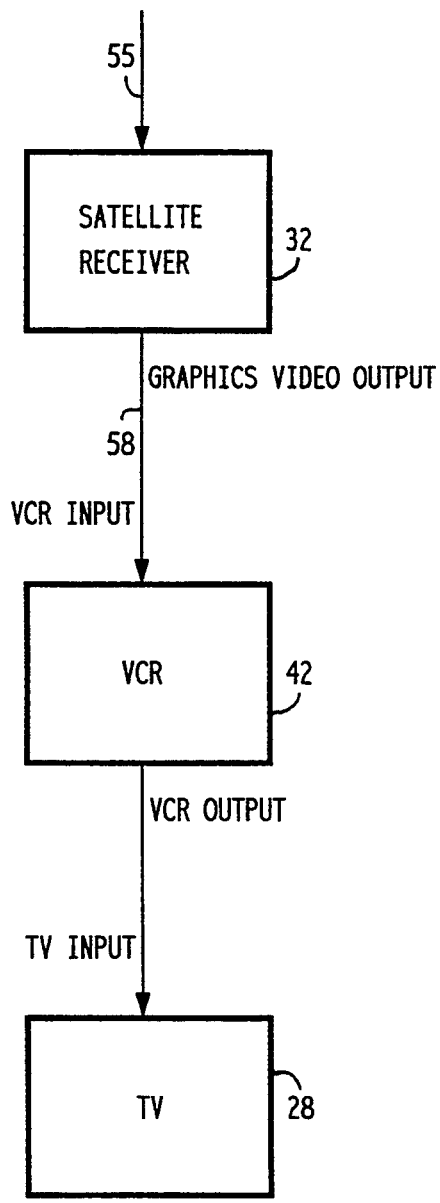
FIG. 14A illustrates the interconnections between the satellite receiver, VCR, and TV when information in the satellite receiver is being backed-up using the VCR.
Figure 14B:
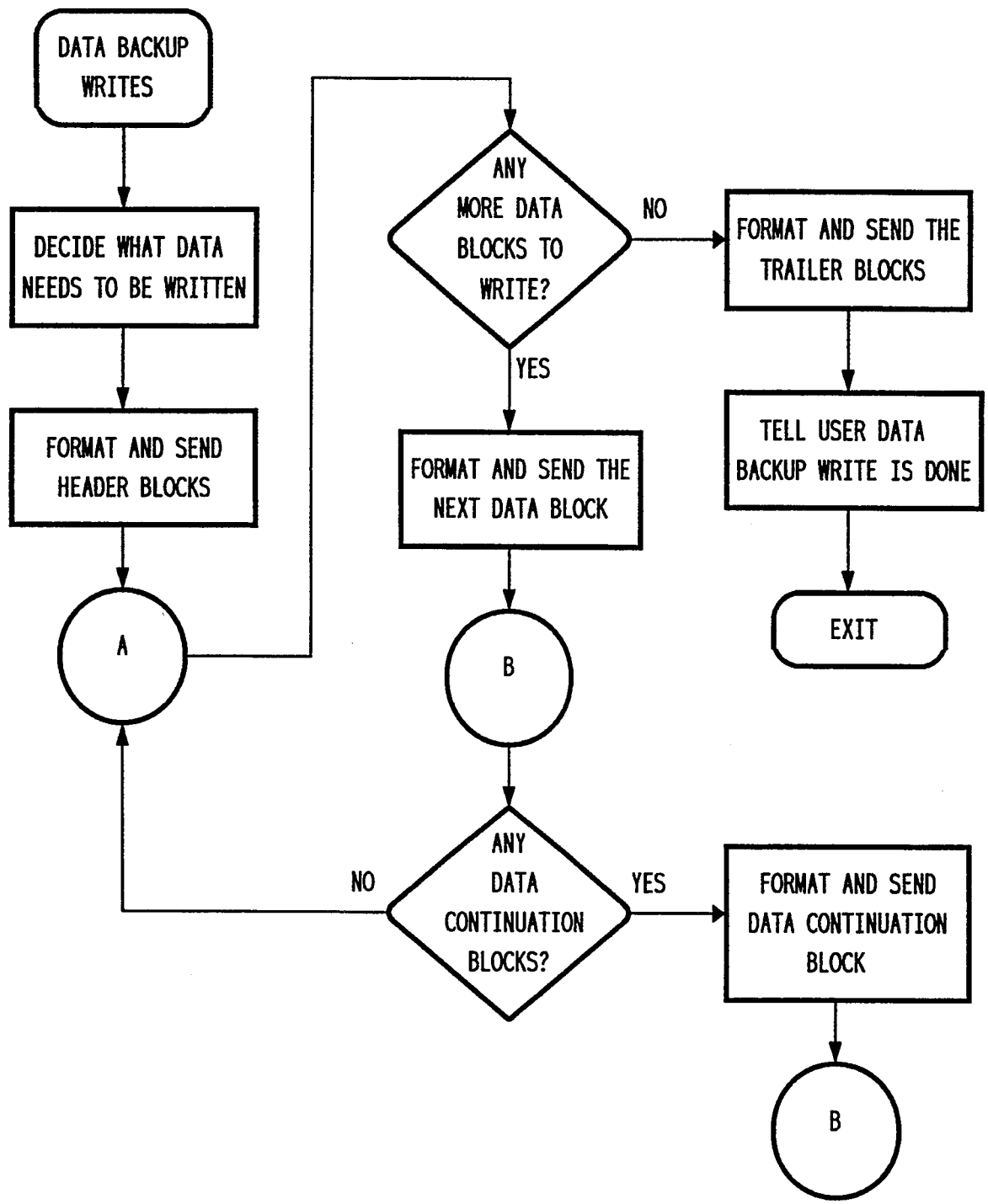
FIG. 14B is a flow chart showing the operations that occur during the backup of satellite receiver information using the VCR.

With reference to FIGS. 14A–14C, the data back-up operation of the satellite receiver 32 of the present invention is described. The data backup operation is initiated by the user entering the appropriate command via the user interface 34 of the receiver 32. In response, the satellite receiver 32 generates a television picture signal with textual information that instructs the user on the appropriate interconnections between the satellite receiver 32, the VCR 42, and the television 28 for accomplishing a data backup operation. Specifically, the user is instructed to connect the graphic video output port 58 of the satellite receiver to the input port of the VCR 42 so that the digital information contained in the satellite receiver 32 can be encoded in a television picture signal that can be recorded by the VCR 42 and to connect the output port of the VCR 42 to the input port of the television 28 so that the composite graphics/video signal produced by the satellite receiver 32 can be displayed on the television 28 to instruct and inform the user on the data backup operation.

Once the satellite receiver 32, VCR 42, and television 28 have been configured as illustrated in FIG. 14A, the satellite receiver 32 generates television picture signals that are displayed on the television 28 requesting input from the user on the type of information that is to be backed up using the VCR 42. The user, in turn, can respond by the keypad 38 or the remote handset 40. This interaction between the satellite receiver 32 and the user continues throughout the data backup operation as required. Once the information to be backed-up using the VCR 42 has been determined, the satellite receiver 32, as illustrated in FIG. 14B, sends the appropriate header data packets, data packets, and continuation data packets to the VCR 42 for recordation. Once all of the required data and/or data continuation packets have been sent to the VCR 42, the satellite receiver constructs the trailer data packet and remits it to the VCR 42, thereby completing the data backup process. FIG. 14C illustrates the composition of a typical data backup session in which the session commences with the recordation of header packets that are followed by gap packets, data packets, and data continuation packets. The data backup session terminates with a trailer packet. As previously mentioned, two redundant copies of each packet are constructed by the satellite receiver 32 and conveyed to the VCR 42 so that if there is an error in one of the packets during a data loading operation, there is an alternate data packet that can be interrogated for the information.

Once the data backup operation is complete, the satellite receiver 32 constructs a television picture signal with textual information that instructs the user on how to connect the satellite receiver 32, the VCR 42, and the television 28 for normal satellite television signal reception.

Figure 15A:
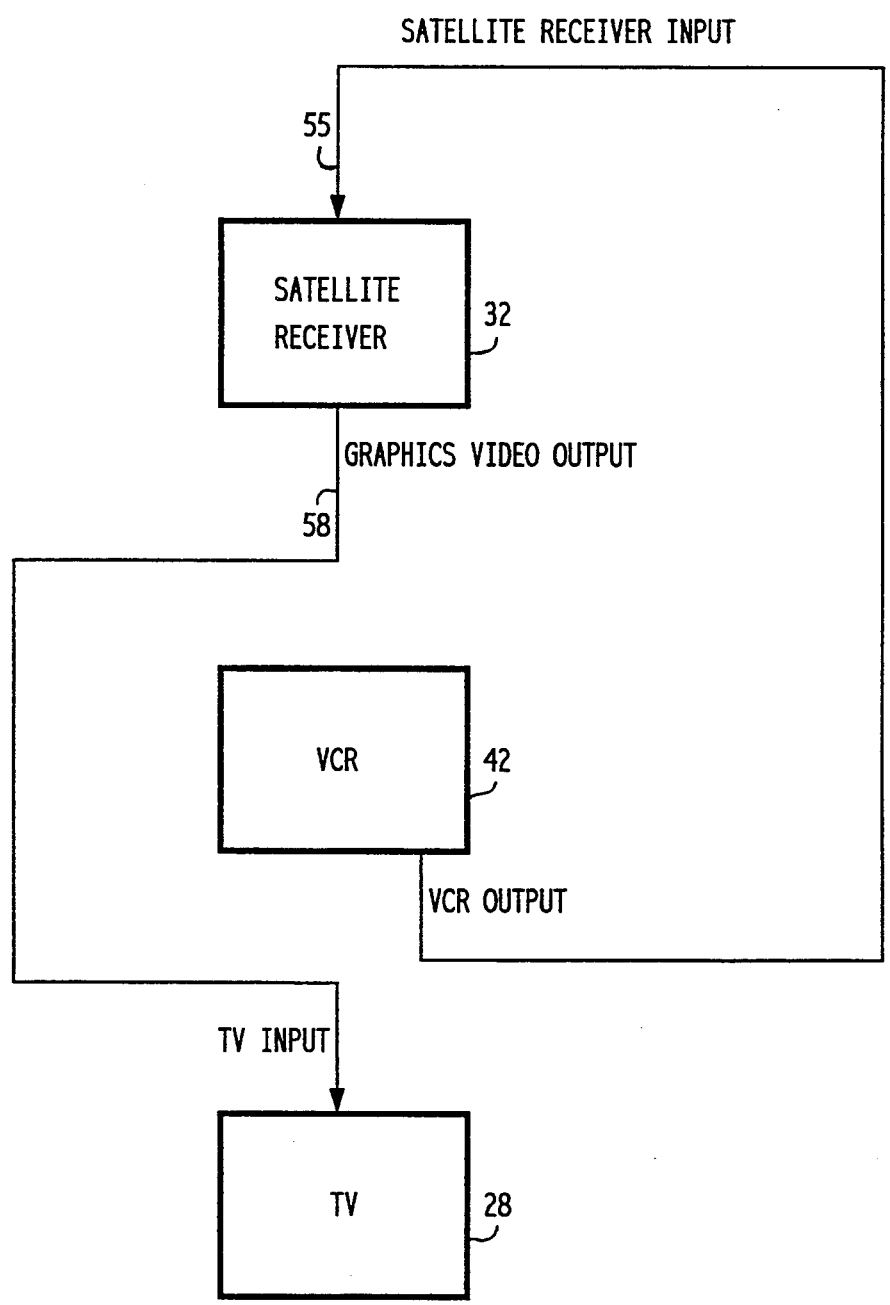
FIG. 15A illustrates the interconnections between the satellite receiver, the VCR, and the TV when data from the VCR is being loaded into the satellite receiver.
Figure 15B:
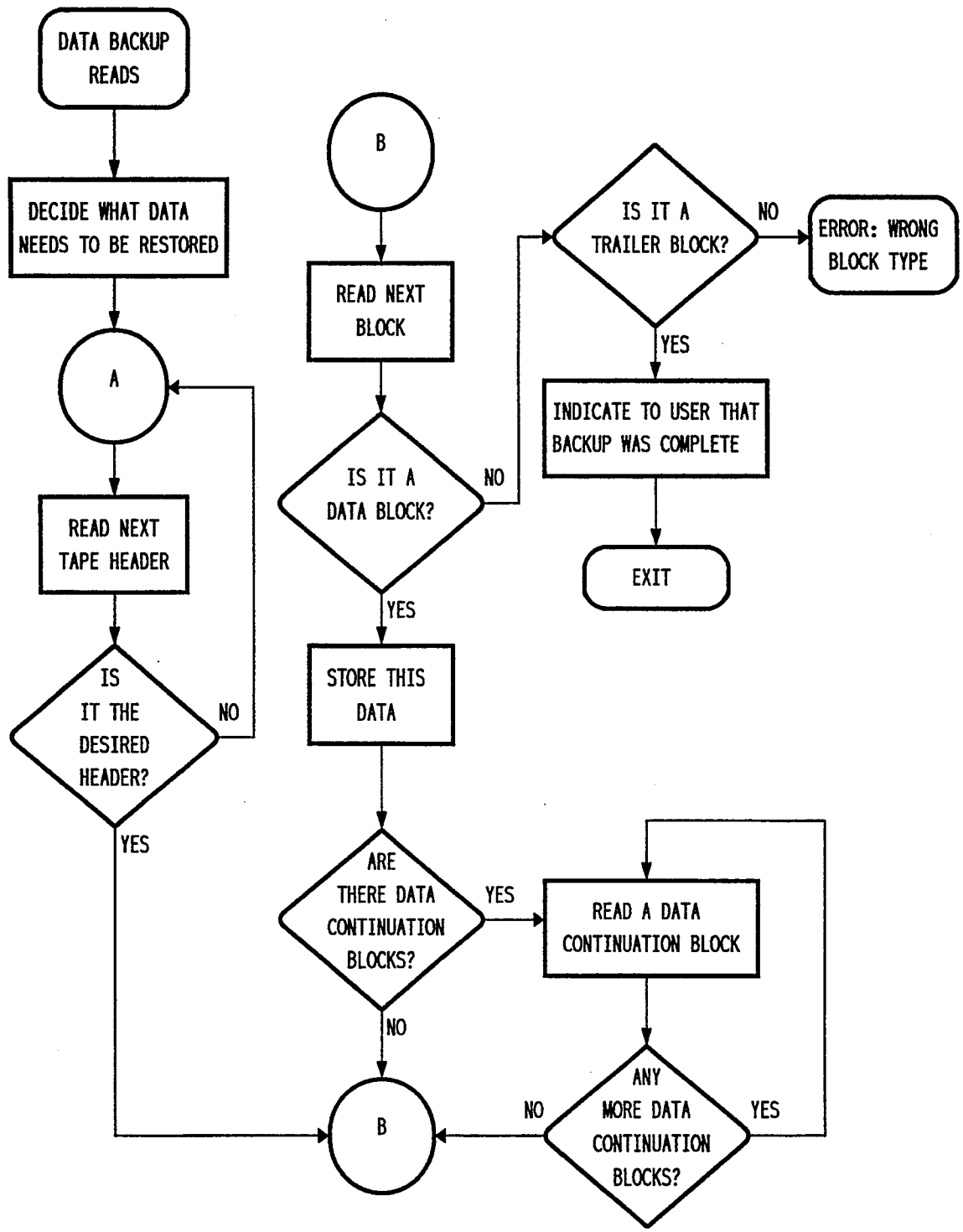
FIG. 15B is a flow chart that shows the operations that occur during the transfer of data from the VCR to the satellite receiver.

With reference to FIGS. 15A-15B, the operation of the satellite receiver 32 of the present invention is described with respect to a data loading operation. As with the data backup operation, the data loading operation is initiated by the user entering the appropriate command into the receiver 32 via the user interface 34. In response, the satellite receiver 32 generates a television picture signal with textual information that is applied to the television 28 and instructs the user on how to connect the satellite receiver 32, the VCR 42, and the television 28 for a data loading operation. Specifically, the user is instructed to connect the output port of the VCR 42 to the input port of the satellite receiver 32 so that the television picture signal with the encoded digital information that is to be loaded into the satellite receiver can be applied to the satellite receiver and to connect the graphics/video output port 58 of the satellite receiver to the input port of the television 28.

Once the satellite receiver 32, the VCR 42, and the television 28 have been appropriately configured for a data loading operation, the satellite receiver 32 constructs a television picture signal with textual information that inquires of the user as to what information located in the VCR 42 is to be loaded into the satellite receiver 32 and applies this television signal to the television 28. The user in turn specifies what information is to be loaded in the satellite receiver 32. This interaction between the satellite receiver 32 and the user, if necessary, can continue throughout the data or information loading operation.

With reference to FIG. 15B, once the information to be loaded into the satellite receiver 32 has been determined, the satellite receiver 32 decodes the data packets and data continuation packets provided by the VCR 42 to recover the digital information contained therein and then stores this digital information at the appropriate locations in the RAM 52. This process continues until the receiver 32 identifies the trailer packet. Once the satellite receiver 32 identifies the trailer packet, it takes the appropriate action to terminate the data loading session. Among the termination actions taken by the receiver 32 are the construction of a television picture signal with textual information that informs the user that the data loading session has ended and instructs the user on how to reconfigure the satellite receiver 32, the VCR 42, and the television 28 for normal operation.

The foregoing description of the invention has been presented for the purpose of illustration and description. Further, the description is not intended to limit the invention to the form disclosed herein. Consequently, variations and modifications commensurate with above teachings, and the skill or knowledge in the relevant art are within the scope of the present invention. For instance, the encryption scheme could use a portion of a horizontal scan line rather than an entire scan line to represent a bit. Further, the chromiance signal rather than the luminance signal could be used as a basis for defining the state of a bit. Additionally, the satellite receiver 32 could be modified by the addition of automatic or manual switches to reduce or eliminate the need for switching the interconnections between the satellite receiver 32, VCR 42, and television 28. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A satellite receiver that is capable of receiving a television signal and has an enhanced memory capability comprising:

a volatile digital memory for storing information that is used in the operation of the satellite receiver, wherein any information that is stored in said volatile digital memory is in a digital format and can be lost;

means for communicating a television signal that contains information that is used in the operation of the satellite receiver with a television signal recording device;

means, in communication with said digital memory and said means for communicating, for translating information that is used in the operation of the satellite receiver between said digital format and said television format so that information stored in said volatile digital memory can be stored using said television signal recording device, and for translating information that is used in the operation of the satellite receiver between said television format and said digital format so that information provided by said television signal recording device can be stored in said volatile digital memory;

means for allowing a user to input data to said satellite receiver, said data can include information to be stored in said volatile digital memory and data relating to the operation of said means for translating; and means for outputting data to a user, said means for outputting includes means for providing television text.

2. A satellite receiver system that is capable of receiving a television signal comprising:

a satellite receiver with a digital memory that can be programmed with information that is used in the operation of the satellite receiver;

a video cassette recorder in communication with said satellite receiver; and a television in communication with said satellite receiver;

said satellite receiver including means for translating information between a digital format and a television signal format so that information from said digital memory can be stored using said video cassette recorder and information provided by said video cassette recorder can be stored in said digital memory;

said satellite receiver includes means for allowing a user to input data to said satellite receiver relating to the operation of said means for translating;

said satellite receiver includes means for use in outputting data to a user that relates to said means for translating.

* * * * *